(12) United States Patent
Army, Jr. et al.

(10) Patent No.: US 10,197,207 B2
(45) Date of Patent: Feb. 5, 2019

(54) CONDUCTIVE ELASTOMERIC FLEXIBLE COUPLING

(71) Applicant: HAMILTON SUNDSTRAND CORPORATION, Windsor Locks, CT (US)

(72) Inventors: Donald E. Army, Jr., Enfield, CT (US); Michael E. Folsom, Ellington, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 886 days.

(21) Appl. No.: 14/602,572

(22) Filed: Jan. 22, 2015

(65) Prior Publication Data

US 2016/0215917 A1  Jul. 28, 2016

(51) Int. Cl.
| | |
|---|---|
| *F16L 25/01* | (2006.01) |
| *F16L 57/00* | (2006.01) |
| *F16L 27/111* | (2006.01) |
| *F16L 51/02* | (2006.01) |
| *F16L 51/03* | (2006.01) |
| *F16L 23/00* | (2006.01) |
| *F16L 47/14* | (2006.01) |
| *F16L 57/02* | (2006.01) |
| *F16L 57/06* | (2006.01) |

(52) U.S. Cl.
CPC .......... *F16L 57/005* (2013.01); *F16L 23/003* (2013.01); *F16L 25/01* (2013.01); *F16L 27/111* (2013.01); *F16L 47/14* (2013.01); *F16L 51/025* (2013.01); *F16L 51/03* (2013.01); *F16L 57/02* (2013.01); *F16L 57/06* (2013.01)

(58) Field of Classification Search
CPC . F16L 25/01; F16L 27/11; F16L 51/03; F16L 51/025
USPC .......................................... 285/226, 235, 236
See application file for complete search history.

(56) References Cited

U.S. PATENT DOCUMENTS

| | | | | |
|---|---|---|---|---|
| 3,249,685 | A | * | 5/1966 | Heflin, Jr. ............... F16L 25/01 174/84 S |
| 3,593,751 | A | * | 7/1971 | Herling ................... F16L 25/01 138/121 |
| 3,838,713 | A | * | 10/1974 | Tubbs .................... F16L 11/111 285/910 |
| 3,943,273 | A | * | 3/1976 | de Putter ................ F16L 25/01 138/137 |
| 4,032,708 | A | * | 6/1977 | Medney ................... H01R 9/05 174/36 |

(Continued)

FOREIGN PATENT DOCUMENTS

WO    WO-8900263 A1 *  1/1989 ............. B64D 45/02

OTHER PUBLICATIONS

European Search Report for Application No. 16152377.4-1754 dated Jun. 13, 2016; 8 Pages.

*Primary Examiner* — David Bochna
(74) *Attorney, Agent, or Firm* — Cantor Colburn LLP

(57) ABSTRACT

A conductive elastomeric flexible coupling for a pneumatic duct system is provided. The coupling includes a tube section. An electrically conductive coating is applied to at least an exterior surface of the tube section. The coating acts as an electrically conductive compliant material configured to conduct electrical charges transferred from a substance carried by and flowing through the duct system and accommodate large deflections.

20 Claims, 1 Drawing Sheet

(56) References Cited

U.S. PATENT DOCUMENTS

| | | | | |
|---|---|---|---|---|
| 4,120,325 A * | 10/1978 | de Putter | F16L 25/01 | 138/145 |
| 4,508,370 A * | 4/1985 | Schroeder | F16L 27/107 | 138/DIG. 2 |
| 4,819,970 A * | 4/1989 | Umehara | F16L 11/15 | 285/227 |
| 4,971,121 A * | 11/1990 | Guertin | B67D 7/54 | 141/1 |
| 4,971,727 A | 11/1990 | Takahashi et al. | | |
| 5,081,326 A | 1/1992 | Usui | | |
| 5,382,359 A * | 1/1995 | Brandt | B01D 27/08 | 210/243 |
| 5,469,892 A * | 11/1995 | Noone | F16L 11/11 | 138/121 |
| 5,791,696 A * | 8/1998 | Miyajima | F16L 11/11 | 285/222.1 |
| 5,829,483 A * | 11/1998 | Tukahara | F16L 11/11 | 138/109 |
| 6,310,284 B1 * | 10/2001 | Ikeda | H02G 3/0468 | 138/121 |
| 6,442,012 B2 * | 8/2002 | Koike | F16L 25/01 | 361/212 |
| 6,854,769 B2 * | 2/2005 | Lutzer | F16L 25/12 | 285/226 |
| 7,398,798 B2 * | 7/2008 | Ostan | F16L 55/041 | 138/114 |
| 7,452,004 B2 * | 11/2008 | Hayakawa | F16L 25/01 | 285/347 |
| 8,230,885 B2 * | 7/2012 | Krauss | F16L 11/11 | 138/109 |
| 8,590,576 B2 * | 11/2013 | Hagist | F16L 55/04 | 138/121 |
| 2003/0099799 A1 * | 5/2003 | Koike | F16L 11/127 | 428/36.91 |
| 2004/0201217 A1 * | 10/2004 | Mobley | F16L 25/01 | 285/417 |
| 2006/0125233 A1 * | 6/2006 | Cantrell | F16L 25/01 | 285/256 |
| 2008/0102660 A1 * | 5/2008 | Wittwer | F16L 25/01 | 439/100 |
| 2009/0084600 A1 | 4/2009 | Severance | | |
| 2012/0131928 A1 | 5/2012 | Damgaard et al. | | |

* cited by examiner

CONDUCTIVE ELASTOMERIC FLEXIBLE COUPLING

FIELD OF INVENTION

The subject matter disclosed herein relates generally to the field of couplings and, more particularly, to conductive elastomeric flexible couplings for a pneumatic duct system.

BACKGROUND

Thermal-resistance joints and couplings facilitate thermal expansions and mechanical motions in high-temperature pneumatic systems and the like. In the aircraft industry, as well as other industries, a pneumatic duct system is employed for carrying a heated substance under pressure. For example, compressed air bled from an aircraft engine is under high temperatures and, thus, pressures. As such, a coupling used in such a duct system must afford a highly efficient and dependable static and dynamic sealing protection and flexibility that is not subject to fatigue or wear failures under such conditions. The flexible coupling must be configured to also meet a conductivity requirement (e.g., electrical resistance from end-to-end of the coupling of no greater than 0.50 megaohms).

Toward that end, conductive wire mesh has been used to produce such a coupling. More specifically, the mesh is integrated into the coupling, which may require large convolutions. The mesh is equally spaced around a circumference of the flexible coupling and may or may not be visible. The mesh is typically made of, for example, an elastomeric composite and Monel wires. The coupling may be silicone-reinforced with a fabric such as aramid (particularly, Nomex®) or reinforced with fiberglass or ceramic fibers.

BRIEF DESCRIPTION OF INVENTION

According to a non-limiting exemplary embodiment of the invention, a conductive elastomeric flexible coupling for a pneumatic duct system is provided. The coupling includes a tube section. An electrically conductive coating (e.g., paint or ink) is applied to at least an exterior surface of the tube section. The coating acts as an electrically conductive compliant material configured to conduct electrical charges transferred from a substance carried by and flowing through the duct system and accommodate large deflections.

In aspects of the embodiment of the coupling, the coating includes paint or ink. Also, the tube section extends between a pair of end portions of the coupling and defines a tube boot in a substantially central region of the tube section. In a version of the aspects, the tube boot is made of reinforced-silicone. Furthermore, each of the end portions of the coupling takes a form of a bead, an annular flange, or stop. In a version, a pair of clamps are respectively located proximate the end portions between the tube boot and end portions. In addition, the coupling includes further at least one convolution that extends radially outward from the tube section and enables large axial deflections. In a version, two pairs of spaced convolutions are located proximate the duct boot between the duct boot and corresponding end portions of the coupling. In another version, the convolutions are hollow corrugations surrounding the tube section. Moreover, the coupling is composed of a reinforced-silicone-rubber compound. In a version, the paint or ink is made of a conductive silicone compound.

Also according to a non-limiting exemplary embodiment of the invention, a method of fabricating a conductive elastomeric flexible coupling for a pneumatic duct system that includes a tube section is provided. The method includes dipping the tube section into an electrically conductive coating or brushing or spraying the coating onto the tube section to apply the coating to at least an exterior surface of the tube section, allowing the coating to adhere to the tube section, allowing the coating to dry, and allowing the coating to cure. The coating acts as an electrically conductive compliant material configured to conduct electrical charges transferred from a substance carried by and flowing through the duct system and accommodate large deflections.

In aspects of the embodiment of the method, the coating includes paint or ink. Also, the drying is at room temperature, and the curing is for about five to about ten minutes at temperatures ranging from about 50° C. to about 175° C. Furthermore, the paint or ink is burnished with a towel after the drying.

The conductive elastomeric flexible coupling according to the invention simply bleeds static charge from the pneumatic duct system joined using the coupling. Also, the coupling can be applied to any application requiring a conductive elastomeric member, and the coupling meets conductivity requirements. Furthermore, use of the conductive coating (i.e., paint or ink) limits or prevents reassembly of the coupling to meet electrical bonding requirements (i.e., test failure, disassembly, silicone-flash removal, cleaning, re-installation, and re-testing). In addition, incorporating the conductive coating into the coupling is relatively easy, and applying the conductive coating to complex features, such as convolutions that give the coupling a large range of flexibility, is relatively simple. Moreover, fabricating the conductive coating into the coupling is relatively less costly.

BRIEF DESCRIPTION OF DRAWING

The subject matter that is regarded as the invention is particularly pointed out and distinctly claimed in the claims at the conclusion of the specification. The foregoing and other features and advantages of the invention are apparent from the following detailed description taken in conjunction with the accompanying drawing in which:

DETAILED DESCRIPTION OF INVENTION

Figure 2:
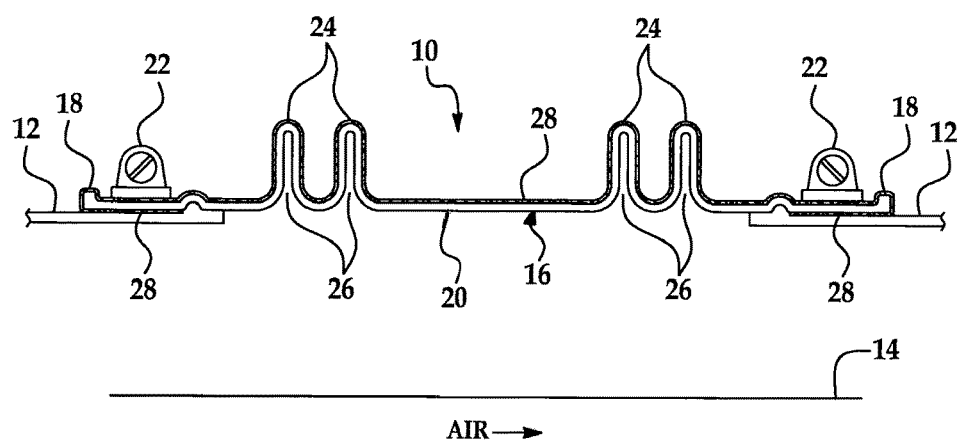
FIG. 2 is a partial environmental sectional view of the embodiment of the conductive elastomeric flexible coupling illustrated in FIG. 1 used with a pneumatic duct system.

The figures show a non-limiting exemplary embodiment of a conductive elastomeric flexible joint or coupling 10 according to the invention configured to be implemented with a pneumatic duct system (FIG. 2). More specifically, the coupling 10 is configured to be installed on and join together mating straight portions 12 of respective conductive beaded duct sections 14 of the duct system. A hot substance, such as a hot fluid (e.g., hot air), is carried by and flows at a high velocity through the duct sections 14. The air is shown flowing to the right in FIG. 2. By way of example only, a typical velocity of the flowing air can be Mach 0.2, and a maximum operating temperature for the coupling 10 can be about 350° F.

It should be readily appreciated that the coupling 10 may be implemented also with other suitable substance-carrying systems. Also, the coupling 10 can be installed on any suitable portion of the duct system. Furthermore, the coupling 10 can be installed to and rotate with respect to the duct sections 14 in any suitable manner. In addition, the hot substance carried by and flowing through the duct sections 14 can be any suitable substance, in general, and fluid, in particular. Moreover, the air can flow at any suitable velocity, and the coupling 10 can operate at any suitable temperature limit.

Figure 1:
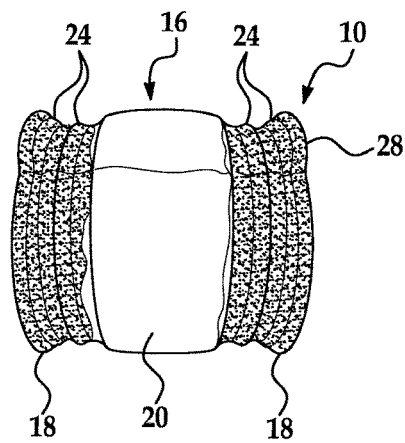
FIG. 1 is a longitudinal view of a non-limiting exemplary embodiment of a conductive elastomeric flexible coupling according to the invention.

As shown in FIGS. 1 and 2, the coupling 10 is circular in cross-section and includes generally a tube section 16 and a pair of opposed end portions 18 between which the tube section 16 extends. The tube section 16 and end portions 18 are disposed in axial alignment with each other for carrying the air at high pressures and temperatures. The tube section 16 defines a tube boot 20 in a substantially central region of the tube section 16 and coupling 10. In an aspect of the embodiment, the tube boot 20 is convoluted and made of aramid or glass or ceramic fabric-reinforced silicone. Each end portion 18 of the coupling 10 takes a form of a bead, an annular flange, or stop 18. A pair of clamps 22 (FIG. 2)—e.g., typical hose clamps 22—are respectively located proximate the end portions 18 between the tube boot 20 and end portions 18. A cuff (not shown) of the coupling 10 interfaces with ends of each straight portion 12.

The tube section 16 also carries at least one convolution 24 that extends radially outward from the tube section 16 and enables large axial deflections. In an aspect, two pairs of spaced convolutions 24 are located proximate the duct boot 20 between the duct boot 20 and corresponding end portions 18 of the coupling 10. The convolutions 24 may be hollow corrugations surrounding the tube section 16. Each convolution 24 is shown in FIG. 2 defining an interior space 26 that provides the coupling 10 ability to accommodate a large range of axial motion.

The coupling 10 may be composed of aramid or glass or ceramic fabric-reinforced silicone rubber or similar resilient material that is unaffected by the hot air to be handled by the coupling 10 and retains its characteristics of flexibility and resiliency throughout a wide range of temperatures. The coupling 10 may be composed also of materials having characteristics of low wear and high flexibility throughout a range of temperatures. In areas such as the convolutions 24 and stop 18, a fabric chord is typically inserted into the lay-up. The chord assists in maintaining shape of the convolutions 24 under pressure. The chord also, at the stop 18, prevents the coupling 10 from separating from the straight portions 12 when the hose clamp 22 is tightened.

It should be readily appreciated that the coupling 10 can have any suitable shape, size, and structure and structural relationship with the duct sections 14. Also, each of the tube section 16, end portions 18, duct boot 20, hose clamps 22, and convolutions 24 can have any suitable shape, size, and structure and structural relationship with a remainder of the coupling 10. Furthermore, the coupling 10 can carry the air at any suitable pressures and temperatures. In addition, the coupling 10 can carry any suitable number of convolutions 24. Moreover, the coupling 10 may be composed of any suitable material.

The coupling 10 includes also an electrically conductive coating 28 that is applied to at least an exterior surface of the coupling 10 configured to provide an electrically conductive path. The coating 28 acts as an electrically conductive compliant material configured to conduct electrical charges transferred from a substance carried by and flowing through the duct system and accommodate large deflections. The coating 28 also maintains electrical conductivity as the coupling 10 extends and contracts. The coupling 10 and coating 28 are configured to operate at a specified temperature.

More specifically, the coating 28 is paint or ink 28 and applied to at least a portion of an exterior surface of the tube section 16 and end portions 18. In an aspect, the paint or ink 28 is applied to substantially an entirety of the exterior surface of the coupling 10, including the tube boot 20, and at least portions of an interior surface of the coupling 10 that are to be in direct contact with an outer surface of the respective straight duct portions 12 of the duct system. Alternatively, the outer surface of the straight duct portions 12 in contact with the coupling 10 can be coated with a conductor. For example, in the context of aluminum ducts specifically, the outer surface of the straight duct portions 12 can be coated with MIL-C-5541. Also in an aspect, the paint or ink 28 is made of silicone.

The coupling 10 can be dipped into the paint or ink 28, or the paint or ink 28 can be brushed or sprayed onto the coupling 10. In either case, the paint or ink 28 adheres to the coupling 10, including the silicone of the tube boot 20. In an aspect, the paint or ink 28 is allowed to dry at room temperature followed by curing at temperatures ranging from 50° C. to 175° C. In a version of this aspect, the curing is for five to ten minutes at 175° C. In the case of the coupling 10 being dipped into the paint or ink 28, the paint or ink 28 can be burnished with a towel after the drying. In this way, fabrication of the coupling 10 is simplified, and cost thereof is reduced.

The paint or ink 28 is very adherent, flexible, and tactile and can be marked using permanent ink. The paint or ink 28 also allows for a multitude of ground paths across the coupling 10. With use of the paint or ink 28, a resistance of a circumference of the coupling 10 is measured to be about five-thousand ohms (compared to a maximum requirement of about five-hundred-thousand ohms).

It should be readily appreciated that the paint or ink 28 can be applied to any suitable areas of the coupling 10 in any suitable amount. Also, the paint or ink 28 can be made of any suitable electrically conductive material. Furthermore, the paint or ink 28 can be applied to the coupling 10 in any suitable manner. In addition, the paint or ink 28 can be allowed to dry and cure at any suitable temperature for any suitable amount of time. Moreover, in the case of the coupling 10 being dipped into the paint or ink 28, the paint or ink 28 can be burnished in any suitable manner.

In operation, the coupling 10 is installed on the straight duct portions 12 of the respective duct sections 14 of the duct system. The hot air is carried by and flows through the duct sections 14. The heat appearing on the tube section 16 is transferred or conducted to and through the convolutions 24 and dissipated into surrounding atmosphere. By employing the extended heat path via the convolution(s) 24, the tube boot 20 is protected from high temperature within the tube section 16. The hot air carried by the tube section 16 is prevented from escaping.

The coupling 10 is simple, practical, and dependable and adapted to be employed in the high-pressure, high-temperature duct system. The coupling 10 also absorbs thermal expansion and large displacements of the duct system. The coupling 10 also is light, suitably resilient, and capable of providing efficient sealing under simultaneous dynamic- and static-load conditions.

The coupling 10 simply bleeds static charge from the duct sections 14 joined to each other using the coupling 10. Also, the coupling 10 can be applied to any application requiring a conductive elastomeric member, and the coupling 10 meets conductivity requirements. Furthermore, use of the conductive coating (i.e., paint or ink) 28 limits or prevents reassembly of the coupling 10 to meet electrical bonding requirements (i.e., test failure, disassembly, silicone-flash removal, cleaning, re-installment, and re-testing). In addition, incorporating the conductive coating 28 into the coupling 10 is relatively easy, and applying the conductive coating 28 to complex features, such as convolutions 24 that give the coupling 10 a large range of flexibility, is relatively simple. Moreover, fabricating the conductive coating 28 into the coupling 10 is relatively less costly.

While the invention has been described in detail in connection with only a limited number of embodiments, it should be readily appreciated that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various non-limiting embodiments of the invention have been described, it is to be readily appreciated that aspects of the invention may include only some of the described embodiments. Accordingly, the invention is not to be seen as limited by the foregoing description, but is only limited by the scope of the appended claims.

The invention claimed is:

1. A pneumatic duct system, comprising
   first and second duct sections;
   an elastomeric flexible coupling disposed between and connecting the first and second duct sections; and
   pressurized air carried by and flowing through the duct system, including through the first and second duct sections and the elastomeric flexible coupling;
   said elastomeric flexible coupling including an electrically conductive coating on at least an exterior surface of the elastomeric flexible coupling and acting as an electrically conductive compliant material configured to conduct electrical charges transferred from the flowing pressurized air and accommodate large deflections,
   wherein the coupling comprises further a tube section and at least one convolution that extends radially outward from the tube section and enables large axial deflections.

2. The pneumatic duct system of claim 1, wherein the coating includes paint or ink.

3. The pneumatic duct system of claim 2, wherein the paint or ink comprises a conductive silicone compound.

4. The pneumatic duct system of claim 1, wherein the elastomeric flexible coupling includes a tube section that extends between a pair of end portions of the coupling and defines a tube boot in a substantially central region of the tube section, and further wherein two pairs of spaced convolutions are located at opposing ends of the tube boot between the tube boot and corresponding end portions of the coupling.

5. The pneumatic duct system of claim 4, wherein the convolutions include hollow corrugations surrounding the tube section.

6. The pneumatic duct system of claim 4, wherein the tube boot comprises reinforced-silicone.

7. The pneumatic duct system of claim 1, wherein the coupling comprises a reinforced-silicone-rubber compound.

8. The pneumatic duct system of claim 1, wherein the coating covers the entirety of the exterior surface of the coupling.

9. The pneumatic duct system of claim 1, wherein the coating is on at least portion of an interior surface of the coupling in contact with an outer surface of the first or second duct portions.

10. The pneumatic duct system of claim 1, wherein the coupling has an electrical resistance from end-to-end of the coupling of less than or equal to 0.50 megaohms.

11. The pneumatic duct system of claim 1, wherein the pressurized air is at a velocity of Mach 0.2.

12. The pneumatic duct system of claim 11, wherein the pressurized air is at a temperature of 350° F.

13. A pneumatic duct system, comprising
    first and second duct sections;
    an elastomeric flexible coupling disposed between and connecting the first and second duct sections; and
    pressurized air carried by and flowing through the duct system, including through the first and second duct sections and the elastomeric flexible coupling;
    said elastomeric flexible coupling including an electrically conductive coating on at least an exterior surface of the elastomeric flexible coupling and acting as an electrically conductive compliant material configured to conduct electrical charges transferred from the flowing pressurized air and accommodate large deflections,
    wherein the elastomeric flexible coupling includes end portions, and each of the end portions of the coupling takes a form of a bead, an annular flange, or stop.

14. The pneumatic duct system of claim 13, wherein the coating includes paint or ink.

15. The pneumatic duct system of claim 14, wherein the paint or ink comprises a conductive silicone compound.

16. The pneumatic duct system of claim 13, wherein the coupling comprises a reinforced-silicone-rubber compound.

17. The pneumatic duct system of claim 13, wherein the coating covers the entirety of the exterior surface of the coupling.

18. The pneumatic duct system of claim 13, wherein the coating is on at least portion of an interior surface of the coupling in contact with an outer surface of the first or second duct portions.

19. A pneumatic duct system, comprising
    first and second duct sections;
    an elastomeric flexible coupling disposed between and connecting the first and second duct sections; and
    pressurized air carried by and flowing through the duct system, including through the first and second duct sections and the elastomeric flexible coupling;
    said elastomeric flexible coupling including an electrically conductive coating on at least an exterior surface of the elastomeric flexible coupling and acting as an electrically conductive compliant material configured to conduct electrical charges transferred from the flowing pressurized air and accommodate large deflections,
    wherein the elastomeric flexible coupling includes a tube section that extends between a pair of end portions of the coupling and defines a tube boot in a substantially central region of the tube section, and further wherein a pair of clamps are respectively located proximate the end portions between the tube boot and end portions.

20. The pneumatic duct system of claim 19, wherein the tube boot comprises reinforced-silicone.

* * * * *